Nov. 10, 1942.  A. A. RUBLY  2,301,816
TRANSMISSION SHIFT REMOTELY CONTROLLED
Filed Sept. 22, 1937  2 Sheets-Sheet 1
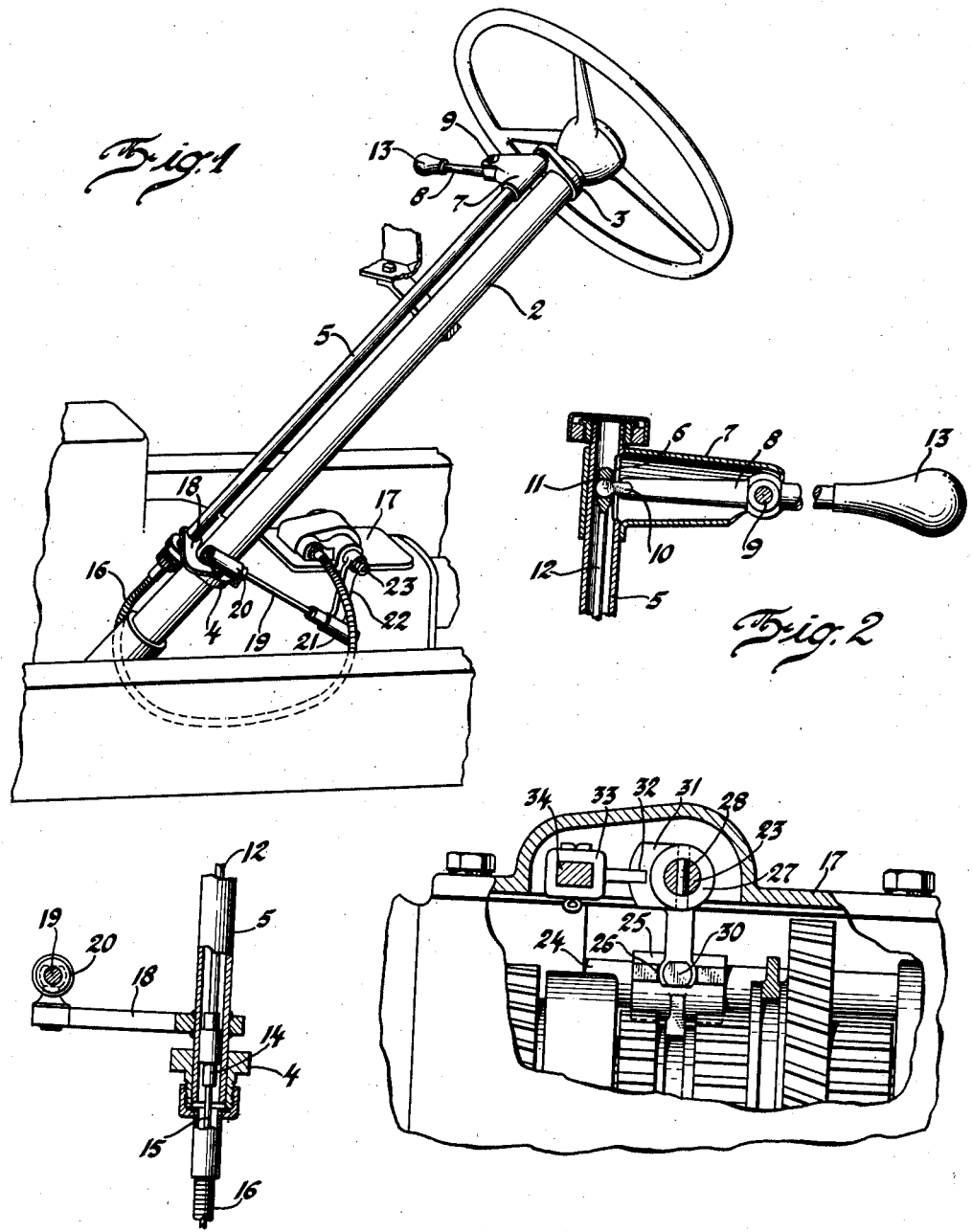

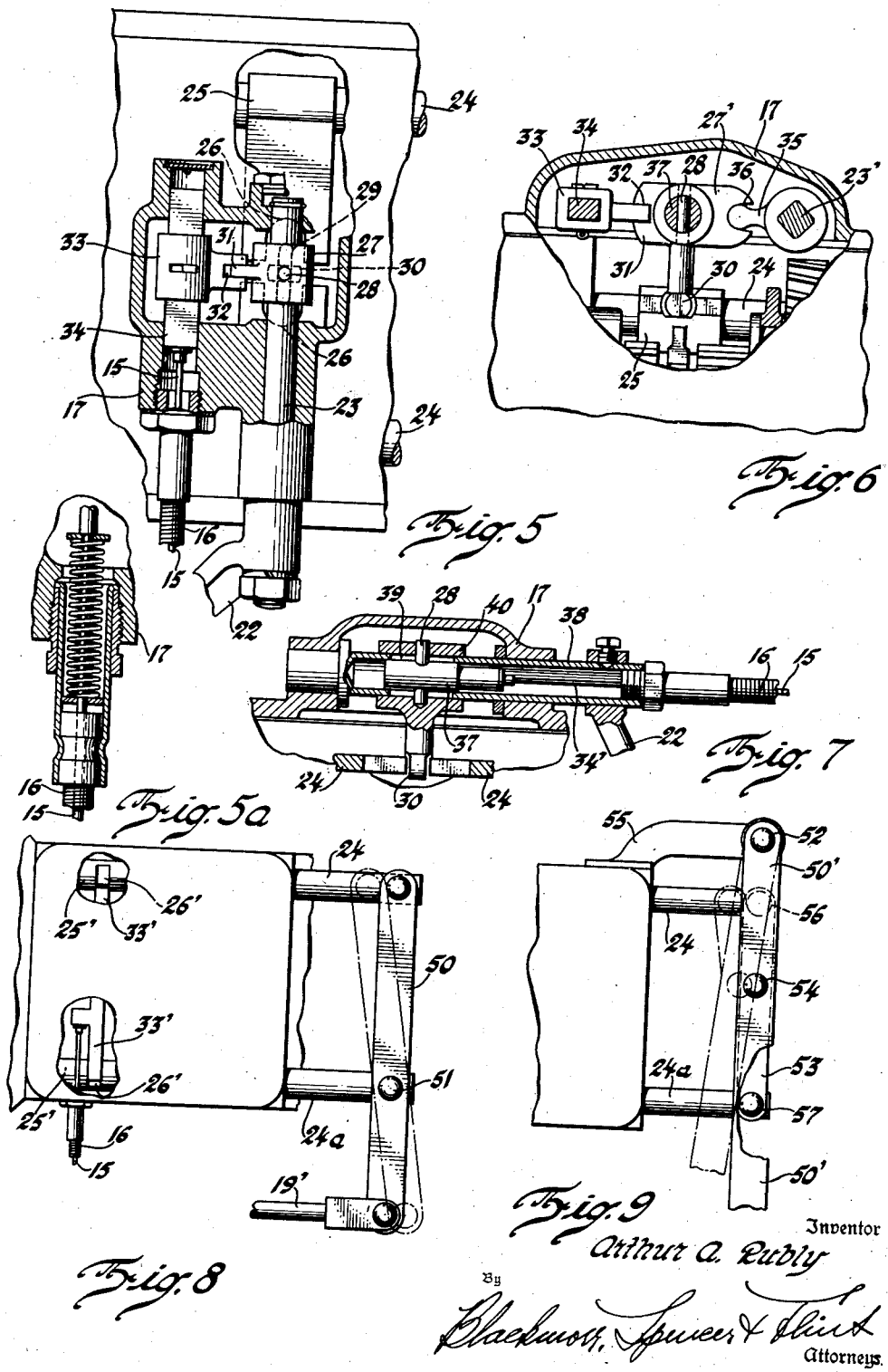

Patented Nov. 10, 1942

2,301,816

UNITED STATES PATENT OFFICE 2,301,816

TRANSMISSION SHIFT REMOTELY CONTROLLED

Arthur A. Rubly, Farmington, Mich., assignor to General Motors Corporation, Detroit, Mich., a corporation of Delaware Application September 22, 1937, Serial No. 165,018

21 Claims. (Cl. 74—484)

The invention relates to improvements in shifter mechanism for change speed gearing or the like.

The invention consists essentially of distantly located combined selector and actuating elements having a plurality of mechanical connections therebetween, one for the selector movement and another for actuation of the change speed gearing.

The object of the invention is to provide a simple and rugged mechanism for manual selection and actuation of change speed gearing as more particularly used in motor vehicles whereby the gearing may be located at any desired place and operated entirely by hand from a convenient position in the driver's compartment, so that full use of the leg room is obtained.

Other objects and advantages will appear in the following description and associated drawings, in which:

Figure 1 is a perspective view of an installation of the invention.

Figure 2 is an enlarged sectional elevation of the manual control mechanism in the driver's compartment.

Figure 3 is a detail enlarged sectional view of the lower end of the control mechanism shown in Figure 2.

Figure 4 is a vertical sectional view of the gear shifting mechanism shown in Figure 1.

Figure 5 is a plan view partly in section of the operating mechanism for the gearing of Figure 4. Figure 5a shows a modification of the transverse interlock method described in Figure 5.

Figure 6 represents a modification of the arrangement of Figures 4 and 5 wherein an auxiliary shift rocking means is shown.

Figure 7 is a vertical cross section of an alternative control to that of Figures 4 and 5, in which the manually operable ratio selector and actuator members are commonly mounted.

Figures 8 and 9 are plan views of alternative shift actuator constructions to the showing of Figures 5 and 7.

Referring to the drawings and particularly Figures 1, 2, and 3, the invention is shown mounted in part on the stationary steering column 2 of a motor vehicle, though it must be understood that it may be mounted on any support convenient to the driver's compartment.

Bearing brackets 3 and 4 are clamped to the upper and lower portions of the column 2 and rotatably support the hollow shaft 5, which is cut away adjacent the upper end to form the aperture 6 and has the selector head 7 secured thereto about the cut-away portion and extending outwardly therefrom.

The selector head 7 has the lever 8 mounted intermediate of its length on the cross pivot pin 9 so that it may have a limited rocking motion with the inner end 10 projecting through the aperture 6 and into a slot 11 in a rod 12 movable longitudinally in the hollow shaft 5.

The lever 8 has a handle 13 at its outer end, movable to either rock the lever or rotate the hollow shaft 5 in the bearing brackets 3 and 4 to select and actuate by hand the change speed gearing shifter mechanism.

For translating the selective rocking movement of the lever 8 to the shifter mechanism, the lower end of rod 12 is attached at 14 as in Figure 3 to a flexible member 15 enclosed in a conduit 16 attached at one end to the lower end of the hollow shaft 5 and at its other end to a cover plate 17 of the change speed gear box, as shown in Figure 4 and 5. The flexible member 15 enters an orifice in the cover plate 17 and transmits both compressional and tensional forces.

For translating the actuating rotational manual force applied to the shaft 5 to the shifter mechanism, an arm 18 is fixedly secured at its inner end to said shaft immediately above the bracket 4 and at its outer end is connected to one end of the rod 19 by a ball and socket joint 20.

The other end of the rod 19 is connected by a ball and socket joint 21 to a lever 22 secured to the outer end of a cross shaft 23 mounted to rock in suitable bearings in the cover plate 17.

Figure 4 is a typical section through a transmission equipped with my invention, the shifter and presetting mechanism being shown in plan view in Figure 5.

Referring particularly to Figure 5, the cover 17 of a conventional change speed gear box is shown, that is, one having gears that will provide three speeds forward and one reverse, and the cover is broken away only enough to show conventional shifter rails 24, which carry the forks or other means not shown for moving the necessary parts in the gear box to secure the desired speed ratios.

The rails have the customary blocks 25 with opposed notches 26 so that the customary manual shift lever may be rocked sideways to select one or the other rail which is then moved endwise, all as well understood in the art and almost in universal use on automotive vehicles.

In the present invention the usual gear shift lever is dispensed with, and the shaft 23 is provided with a slidable cam member 27 held from rotation by a pin 28 passing through a slot 29 in the shaft. The cam member 27 has a downwardly extending cam 30 and a lateral fin 31 extending into a notch 32 in a block 33 fixed to a slidable bar 34 attached to the end of the flexible member 15. By this means the cam member 27 is moved laterally with the block 33 until the cam 30 is moved entirely into either of the notches 26 in the shifter rail blocks 25, so that the manual rotating movement applied to the handle 13 and the selector head 7 may rock the shaft 23 whereby the cam 30 moves the corresponding shifter rail 24.

Attention is directed to the fact that the sequence of force-transmitting elements including the hand-lever 13—8, the projecting member 7 which carried pivot 9, the shaft 5, arm 18, link 19, lever 22, shaft 23 and the shifter parts in the gearbox, provides a positive, two-way system, yielding a feel to the operator's control of the force conditions within the gearbox, so that while being remotely placed, the operator's control has lost none of its ability to furnish definite and positive response for any desired shift condition.

The modification of Figure 6 shows the shaft 23' secured to the finger 35 which intersects the notch 36 of cam member 27'. The shaft 37 is the support for cam member 27' which may rock similarly to cam member 27 of Figure 5. As in Figure 5, fin 31 is moved by block 33. This arrangement is provided for any purpose wherein a reversal of the movement for given shift positions from the showings of Figures 1 and 3 is desired.

The arrangement of Figure 7 is a modification wherein the conduit 16 of flexible member 15 is attached directly to the outer end of hollow shaft 38 which is rotatably supported similarly to shaft 23 of Figures 4 and 5. Bar 34' is secured to flexible member 15, and is attached by pin 28 movable in slot 39 of shaft 38 to cam member 40. The lever 22 is fixed to shaft 38 for rocking cam 30 as in Figure 4. This form of the invention constitutes a neat installation having a minimum number of parts.

Figure 5a shows a biasing spring 41 of low force value placed in the capsule where flexible connection 15 enters the gearbox, to incline the shift toward the 2nd-high position. Today many persons frequently omit low gear, and alternate between 2nd and high, therefore the biasing spring 41 makes those speed ratios most used more readily available, and also tends to eliminate accidental shift to reverse.

The spring presses against a washer locked to the capsule, and against a washer fixed to the flexible member 15, biasing block 33 of Figure 5 or block 33' of Figure 8.

The force of the shift biasing spring need not be great enough to place the cross shift elements definitely in either rail locking position, but sufficient to provide operator feel.

In Figure 8, the shifter rails 24 and 24a are shown as extending from the gearbox to the rear, each pivoted to a link bar 50 rockable in a horizontal plane, and pivoted at 51 to rod 19' movable by the manually operated steering column mounted construction of Figures 1, 2, and 3. A traversing block 33', moved into and out of registry with notches 26' of rail blocks 25' similarly to the Figure 5 showing, is attached to flexible member 15.

The modification of Figure 9 shows a pivot member 55 attached to the transmission casing, supporting link bar 50' at pivot 52, the bar 50' being operated as 19' of Figure 8. The shift rails 24 and 24a are joined by whiffle bar 53 pivoted thereto at 56 and 57, the central pivot of bar 53 being attached to bar 50' by pivot pin 54. The equalizer motion of whiffle bar 53 provides a useful linkage yielding an equivalent motion for any shift through the H-pattern. By the linkages of Figures 8 and 9, my invention becomes readily adaptable to distance motion with mechanical advantage over other linkages known in this art.

It should be noted that the arrangement of the invention permits the transmitting of the presetting force from the control head rod directly to the cross-shift lock member with such low friction loads that the work is accomplished without the need for mechanical multiplication in the linkage. Another advantage is found in the utilization in the combination of the invention of the solid linkage of crank arms and by link, affording proper feel of the gearbox resistance to shift to the hand pressure of the operator, such as is necessary for proper operation of present day synchronizer equipped transmissions.

The invention provides an effective and positively acting means for selection and actuation of change speed gearing mechanism wherein light, inexpensive parts properly enclosed serve to transmit selection movement, and sturdy, positively acting parts and connections are used for actuation movement adapted for operation at a distance. The floor of the driver's compartment is entirely cleared, and the customary hand shifting movement of the driver takes place in a vertical rather than in a horizontal direction, providing additional leg room, for example.

While the showing herewith is of a customary form of unit power plant in the fore part of the vehicle, it is understood that the invention may be applied to other, more distant locations of the change speed gear box.

Although the preferred embodiment of the invention has been shown, I do not wish to be limited to the particular arrangement and construction of parts, as numerous changes, modifications and use of equivalents may be resorted to without departure from the spirit and scope of my invention and the appended claims.

I herewith claim:

1. In remote controls for motor vehicle power handling devices, in combination, variable speed gearing, longitudinally shiftable members arranged to engage and disengage the drive of said gearing, a shifter bar having a fixed fulcrum, with a link pivoted at its ends to said members and at its mid-point to said bar, an interlocking device selectively operative to permit longitudinal motion of one of said members while preventing such motion of another of said members, and a common control joined to said bar and said device operative to shift said device and then move said bar when establishing gear engagement, and operative to move said bar and then shift said device when establishing gear disengagement.

2. A remote control system for a step ratio transmission, embodying a shifter mechanism including selection and actuation means for establishing gear ratios in said transmission, ratio shifter members operated by said means, and gear engaging elements shifted by said members; the selection motion of said means being limited between transverse end point positions by contact with said members, the actuation motion of said means being limited by the drive engaging positions of said elements and said members and applied rotationally to shift said members; a hand operated control apparatus having a rotatable and rockable manual control lever, a flexible force-transmitting element connecting said lever mechanically with said means for compelling transverse selection motion thereof repeating the rocking movement of said lever in one plane, and having a link connected to said means for compelling the said means to rotate repeating the rotational motion applied to said lever in a second plane; and an arrangement of the said apparatus, said mechanism and said means effective to limit the rocking of said lever by the transverse limits of motion of said means, and effective to limit the rotational motion of said lever in said second plane by the arrival of said means at the limiting drive-engaging positions of said elements and members.

3. In variable speed transmissions, in combination, a gearbox having speed ratio shifting elements, ratio shift mechanism for said gearbox including a flexible control device, a shiftable lock directly connected to said device and arranged to prevent gear engaging motion of one or another of said elements when said device is moved, a rocking bar pivoted to said elements, external speed ratio shifting means connected to said bar whereby the pivot point of one of said elements with said bar may become a fulcrum, and a driver control joined to said mechanism adapted to first shift said lock upon a gear engaging motion, and compel a first movement of said means upon a gear-disengaging motion.

4. In selection and actuation controls for a step ratio transmission gearing having shiftable members having engaged and disengaged positions, a rocking and translating mechanism adapted to select and actuate the shift of said members between said positions and having a translating selection device movable between its end point positions in which one or another of said members are selected for sequential shift actuation thereof, a flexible member attached to said device to translate same for contact with said members at said end point positions, a lever for rocking said mechanism to actuate the shift of said members, a link pivoted to said lever, and manually controlled apparatus for operating said flexible member and said link-and-lever having a single manual control lever mechanically connected to said flexible member and moving in one plane for direct repeating of movement by said device of that of said control lever between said end point positions, and having a direct two-way mechanical connection between the said control lever and said link to move the link in accordance with motion of said control lever in a plane of motion at right angles to the said first plane thereof, said apparatus and said mechanism being arranged such that the end point positions of said device serve to limit the movement of said control lever in said first named plane, and such that the said positions of said members serve to limit those of said link-and-lever, and said control lever in said second named plane, the arrangement providing that for a desired shift of said members to gear engaging positions the said flexible member and link are moved in sequence, and that for a desired shift of said members to disengaged from engaged positions, the sequence of motion of said member and link is inverted.

5. In controls for gearing mechanism, in combination, a casing, two speed ratio shifting elements mounted in said casing for longitudinal movement between gear engagement positions, blocks on said elements including engagement slots, a transversely slidable finger arranged to intersect one of said slots at the limits of allowable transverse movement, a transversely mounted rockable shaft upon which said finger may slide into and out of registry with said slots, said finger being out of registry only in the space between said slots, locating means adapted to compel said finger to rock with rocking movement of said shaft in planes parallel to the motion of said elements, means to shift said finger transversely between said limits, and connections to said finger and said shaft adapted to move the finger and said shaft sequentially for placing said elements in a gear-engaging position, and to move the shaft and finger successively for placing said elements in a gear-disengaging position and external unitary means connected to said transverse shifting means and to said shaft effective to furnish thereto the operative force for said sliding and rocking motion of said finger.

6. In remotely operated controls for motor car gearboxes, in combination, a variable speed transmission having two speed ratio determining shifter elements one of which is movable to establish two different forward speed ratios in said transmission, a selector member shiftable manually to one of two limiting positions from an intermediate central position for locking one shifter element against longitudinal motion while permitting another shifter element to move longitudinally, a positively acting member movable manually in two directions from an inactive position for engaging and disengaging geared drive through longitudinal movement of said elements, and biasing means constantly active to exert a force tending to cause said first named member to be positioned to lock said forward drive shifter element against longitudinal motion.

7. In a variable speed gearing, shiftable gear engaging and disengaging elements, ratio shift control mechanism connected to operate said elements, a casing for said gearing, a manually operable control apparatus for said mechanism and directly and mechanically connected thereto, a removable coverplate for said casing; said mechanism including a transverse shaft mounted to rock in said plate, with a device slidably mounted thereon having both transverse and rocking motion for coaction with said elements, and including a lever supported on said shaft independently operable to rock said shaft and said device, an unitary external shift control means directly connected to said control apparatus operative to first shift said device and then rock said lever when determining gear engagement from a gear-disengaged setting of said elements, and operative to first rock said lever and then shift said device for a successive gear-engaged setting of another element than that one priorly in a gear-engaged position.

8. In controls for motor vehicle gearboxes, in combination, a step-ratio gearing, a casing for said gearing, a single manual operator control means for said gearing, longitudinal guide members in said casing, gear engaging and disengaging elements mounted for movement on said guide members, notches in said elements, a transverse shaft, a shifter finger movable between limiting active positions transversely on said shaft into engagement with one of said notches, shift actuation means effective in an active position to rock said finger and said shaft when said finger is in registry with one of the notches, a flexible element operative to first preset said finger in one or another of said notches upon movement of said actuation means from an inactive to an active position and connecting mechanism between said operator control means and said shift actuation means embodying said flexible element to shift said finger and embodying a solid linkage, a device to rock said actuation means and said finger.

9. In combination, a step-ratio gearing, an operator control therefor movable in one direction for selection action and in another direction for selective actuation of ratio shift of said gearing, shifter elements arranged to establish gear engagement and disengagement therein by longitudinal motion, means connecting said control and said elements for longitudinal movement of the latter with motion of the said control in the second noted direction, a link pivoted to said elements, the pivots constituting mutually acting fulcra and blocking means moved by said control in the first said direction and arranged to alternately prevent longitudinal motion of one of said elements to establish the pivot of that one of said elements as a fulcrum point while permitting longitudinal movement of the other of said elements, said connecting means between said control and said elements being effective to compel a first movement of said blocking means for selection action prior to gear engagement and a first movement of the unblocked element and of the said blocking means for gear disengagement.

10. In transmission controls for motor vehicles, in combination, a steering column, a transmission control system comprising a speed ratio shifter member mounted parallel to said column, a speed ratio selector element mounted for longitudinal motion within said member, input and output shafts coupled by variable speed gearing, gear engagement and disengagement means therefor connected to said member and said element, and a manually operable control connected with said shifter and said element and movable with respect to said steering column effective to apply manual force through the said system for both selecting and for shifting the speed ratio of said gearing.

11. In manual controls for motor vehicles, in combination, a variable speed step ratio gear transmission, a manual control for said gear transmission rocked in one direction for selection and rotatable in another direction for selective actuation, a shiftable mechanism moved by said control having one element providing selective sliding and another providing actuatable rocking motion for establishing gear engagement and disengagement in said transmission, ratio shifting members moved by said mechanism one of which provides shift actuation between two forward speed ratios of said transmission, an interlocking device connected to said first named element and slidable to end positions for selection action and adapted to prevent one of said members from moving while permitting another to move in an actuation direction, connecting means between said control and said mechanism adapted to operate said mechanism and arranged to apply to said mechanism a first selective movement in one direction such that said device prevents one of said members from moving and arranged to apply a second actuating movement for establishing gear engagement by another of said elements, and a biasing means constantly effective to bias said device to occupy a position such that the said forward speed ratio shifting members is normally preset for actuation effected by rocking motion of said mechanism.

12. In a power control device for a transmission including step ratio gearing, a control lever, a shift control mechanism providing selective sliding and actuating rocking motion for establishing gear engagement and disengagement in said transmission, shift actuation elements moved by said mechanism during said actuating motion, a manually operable control apparatus directly connected to said mechanism and adapted to transmit sliding and rocking force directly thereto, said apparatus being arranged to transmit the force of a first selective movement in a direction transverse to the actuation direction of motion of said elements and to transmit the force of a second actuation movement at right angles to said selective movement, said mechanism embodying an interlock device permitting and preventing gear engagement motion of said elements; and two separate and independent means included in said apparatus for directly transmitting the force of said control lever transmitted to said mechanism, one of which is a flexible mechanical connection directly joining said lever and said mechanism for said first selective sliding motion in positioning said interlock device, and the other of which is a solidly acting link connection directly joining said control lever and said mechanism for transmitting said actuating movement thereto.

13. In regulating means for power control mechanisms, in combination, a step-ratio gearing, a control system for said gearing comprising a speed ratio shifter member mounted for rotational motion, a speed ratio selector element mounted for longitudinal motion within said member, a speed ratio actuating shaft rockable about its axis, a presetting device mounted within said shaft for longitudinal motion, flexible connecting means joining said element with said device, positively acting means connecting said member with said shaft, and a single manually manipulable control operative upon said member and said element whereby a first motion of said device with a second motion of said shaft changes the gearing from a disengaged to an engaged condition.

14. In the motor car arts, a vehicle having a stearing column, input and output shafts, step-ratio gearing coupling said shafts, ratio shifting mechanism for said gearing adapted for manual operation, ratio selection and actuation means connected to said mechanism adapted for manual manipulation thereof comprising a rotatable speed ratio shifter member mounted on and parallel to said column, a speed ratio selector element mounted concentrically for longitudinal motion within said member; and a manually operable control connected with said member and said element of said ratio selection and actuation means effective to cause manual selection and manual actuation of said mechanism, when moved to predetermined positions with respect to the center of revolution of said member and to the coincident center line of reciprocation of said element.

15. In manual controls for motor vehicle drives, a step-ratio transmission, a manually operable control system therefor, embodying a shifter mechanism including manually operable selection and actuation devices for establishing gear engagement in said transmission; a shifter control device including an actuation control member and a selection control element supported and mounted coaxially for relative motion with respect to each other, connecting means joining said mechanism and said device, and a handlever operative to provide limited rotation of said member by movement about the common centerline thereof for actuation of said mechanism and to provide limited motion in a plane coincident with said centerline for selection of actuation of said mechanism, the effective limits of motion of said handlever being determined by the structure of the said connecting means and said mechanism.

16. In manual controls for motor vehicle drives, a step-ratio transmission, a mechanical control system for said transmission comprising shifter mechanism adapted to establish manual selection and actuation of ratios by steps in said transmission, a shifter control device adapted to manual positioning in accordance with a predetermined shift control pattern, including a rockable member and a reciprocable element concentrically disposed to each other, a flexible means connecting said element with said mechanism effective to transmit the reciprocating motion of said element in either direction directly to said mechanism for positive manual presetting selection of ratio to be actuated, a solid linkage means operating through one link connecting the said member with said mechanism effective to transmit the rocking motion of said member directly to said mechanism for all rotation forces applied to said member, and a handlever adapted to rock and reciprocate said member and said element respectively between limits in both directions of motion of said handlever determined by the structure of the said mechanism, said device and said connecting means.

17. In the automotive control arts, a motor vehicle, driving and driven shafts coupled by a step ratio transmission, a control system for said transmission embodying a shifter mechanism including translatable selection and rotatable actuation devices for establishing gear engagement in said transmission obtainable through the agency of shiftable drive-engaging elements moved by shiftable members directly mechanically connected to said devices, said elements when driving and said members providing limiting end positions for the motions of said mechanism, the selector motion being applied transversely to preset said mechanism and the actuator motion being applied rotationally to actuate said mechanism between said limiting end positions; a hand control lever mounted on said vehicle for motion in two directions, having a first rocking motion for selection and a second rotational motion for actuation, a link member reciprocated by movement of said lever and connected to said mechanism for applying rotational actuator motion thereto from said lever, and a single flexible element connected to said mechanism and moved by rocking force applied to said lever for translatory selection motion effective to transmit tensional and compressional force, the said end positions determined by said elements and members being correlated through the connections between said shifter mechanism and said lever such that the selection motion of the lever in one direction is limited by the transverse abutment of the selection device with said members and the actuation motion of said lever in the second direction is limited by the arrival of the said members and elements in gear drive engaging positions.

18. In the motor vehicle arts, a variable ratio transmission unit having gearing adapted for driving engagement and a ratio control system therefor including, a ratio control lever, a rotatable member rotated by said lever, a translating element mounted within said member and reciprocable by said lever, ratio shifting means for said transmission including a translatable shift selecting device, and a mechanism adapted to actuate the transmission gearing mechanically both for engagement and disengagement; and joining means connecting said device and said element, and connecting said mechanism and said member operative to transmit rotational effort from said lever and said element to said device, and effective to transmit rotational effort from said lever and member to said mechanism, whereby the gear changing operations of said transmission are accomplished entirely by force applied to said lever.

19. In manual controls for motor car transmissions, a step-ratio transmission, shift selecting and actuating mechanism for said transmission, a manually operable mechanical control system for said mechanism including a member adapted to rock in a limited arc about a centerline in correspondence with shift actuation positions of said mechanism, a reciprocable element concentric with said member adapted to reciprocate between limiting positions in correspondence with shift selection positions of said mechanism, connecting means joining said member and said element with said mechanism; and a manually operable lever connected to said member and said element effective when moved in a plane intersecting the common centerline of said member and element to shift said mechanism directly for prior selection and effective when rotated in a plane at right angles to said centerline to shift said mechanism directly and manually to engage and disengage the gears of said transmission.

20. In motor vehicle controls, the combination of a step ratio gearbox containing gearing arranged to be actuated by sliding motion, controlled by a ratio shifter device mounted transversely in said gearbox for translatory selection and rotatory actuation movements including a translatable selector control and a rotatable actuating control extending from said gearbox, a steering column, a handlever mounted to rotate through a limited arc of motion with respect to said column and to be moved in a plane parallel to the axis of said column, a rotatable hollow shaft mounted parallel to said column and adapted to be rotated by the rotation of said handlever, a reciprocable member mounted within the said shaft and adapted to be reciprocated by the movement of said handlever in said parallel plane, an arm attached to said shaft arranged to swing in a limited arc as said handlever is rotated, said arm being joined to said rotatable control, a flexible element attached to said member and to said translatable control for transmitting thereto direct two-way motion originating in the said planar motion of said handlever, and biasing means effective upon the said translatable control to position it normally for one operative sequence of shift actuation by said hollow shaft, said arm and said rotatable actuating control.

21. In motor vehicle controls, the combination of a step-ratio gearbox containing gearing adapted to be selected and actuated by sliding motion, controlled by ratio shifting mechanism for said gearbox providing limited translatory selection and rocking actuation movements including a translatable selector control and a rockable actuating control operable from outside said gearbox, a steering column, a handlever mounted to rotate through a limited arc of rotation with respect to said column and to be moved in a plane parallel to the axis of said column, a rotatable shaft mounted parallel to said column and adapted to be rotated by the rotation of said handlever, a member mounted for reciprocation in said plane parallel to the said axis and adapted to be moved by rocking movement of said handlever in said parallel plane, an arm attached to said shaft arranged to swing in a limited arc as said handlever is rotated, said arm being articulated to said rockable control, a flexible element attached to said member and to said translatable control for transmitting thereto direct two-way motion originating in the said planar motion of said handlever, and interlocking means effectively positioned by said translatable control at the limits of selector motion thereof to establish fulcra for the actuating movement of said actuating control.

ARTHUR A. RUBLY.